Dec. 20, 1938.   C. A. DOPP   2,140,934
VALVE INDICATOR
Filed Jan. 2, 1937
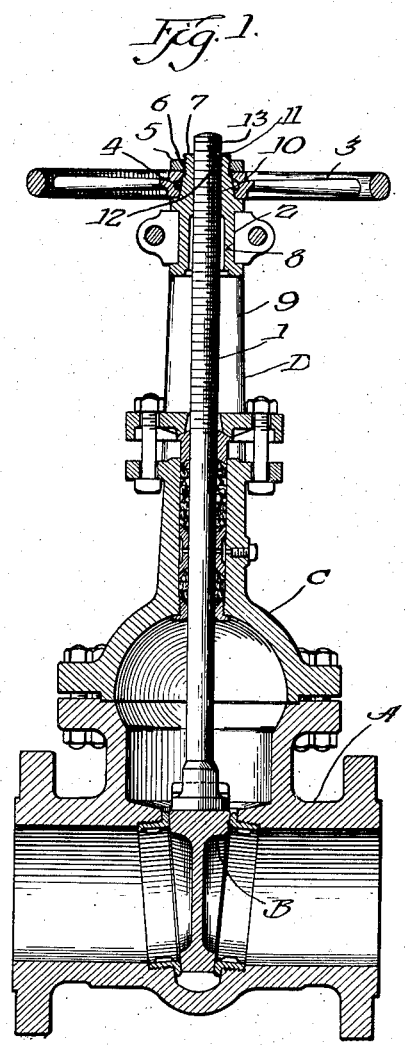
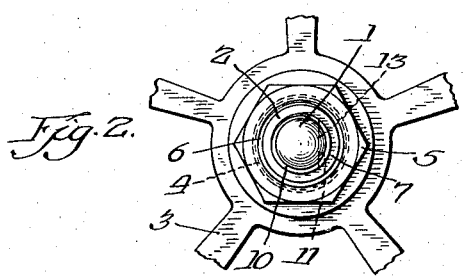
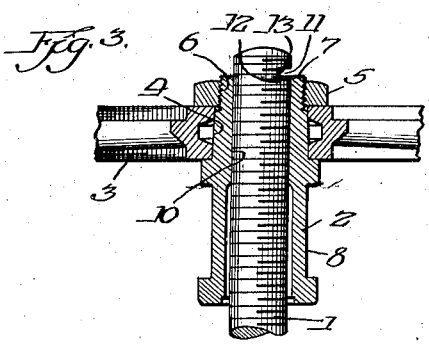
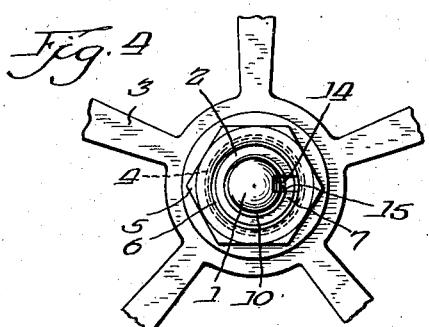
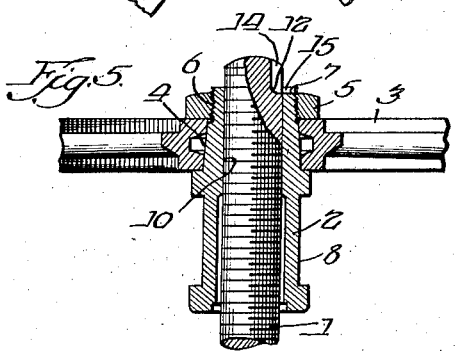
Inventor:
Carl A. Dopp
By Joseph O. Lange
Atty.

Patented Dec. 20, 1938

2,140,934

UNITED STATES PATENT OFFICE 2,140,934

VALVE INDICATOR

Carl A. Dopp, Chicago, Ill., assignor to Crane Co., Chicago, Ill., a corporation of Illinois Application January 2, 1937, Serial No. 118,809

1 Claim. (Cl. 116—125)

My invention relates to a precision indicator which is capable of being applied to a valve in a manner so as to indicate conveniently and accurately that the latter is in its fully closed position.

I am aware that there are valve indicators for the general purpose of showing the open and closed position of a valve, such as that type, for example, which is illustrated on page 85 of Crane Co.'s No. 52 Catalogue. However, these prior indicators have lacked the very essential requirement because of failing to indicate accurately just when the valve was absolutely closed tightly.

In connection with valves and more particularly with valves of the gate type, it has long been a problem of manufacturers to provide simple but effective means for indicating visually or even by touch to the operator that the valve is fully closed. In this connection it should be realized it is especially important for the person operating the valve to avoid the common misunderstanding that because the valve closes with considerably greater effort as it nears its seat that the valve is absolutely tight or is seated. In many cases because of such previous false impression the valves have not been closed tightly, that is disc to seat, with the result that an objectionable condition known as "wire drawing" has occurred, thus eventually causing valve leakage and destroying the seating of the valve which frequently has made it necessary to incur the expense of repair or replacement.

It should be further understood that in many cases where line pressure or flow tends to force or displace the valve closure member toward the downstream side of the casing, the closure member will scrape in closing to such an extent that it is frequently difficult with ordinary effort to seat the valve and usually requires considerable manual effort in obtaining the closing seating movement. As a result of the latter condition, the operator, believing that because of such extra required effort the valve has been seated tightly, ceases his further efforts to close the valve and the trouble and expense above referred to follows.

It is therefore one of the more important objects of this invention to provide simple and fool-proof means accurately established so that the operator by merely looking at the indicator or even by touch will know definitely whether or not the valve has actually been closed tightly.

Another important object is to provide for the positioning of such indicating means adjacent to the valve operating means so that the operation and the observation of the position of the indicator will be more likely to occur at substantially the same time, and further, if there has been any perceptible wear which has occurred between the valve closure and the seat, this also becomes readily apparent to the operator.

Another important object is to provide for a construction which can be easily applied, and preferably is so applied, to the valve after the latter has been fully assembled and tested by the manufacturer, so that the ultimate valve seating position for the recommended service condition is definitely determined before the valve has the indicating means applied thereto and is ready for shipment from the factory.

Another important object lies in the positioning of an indicating means which will not in any manner interfere with the actual operation of the valve itself and is relatively easy and inexpensive to apply so that valves already installed and in service can, with suitable precaution, be provided with the invention herein described, and without necessity for a shut-down of the pipe line.

Other objects and advantages will become more readily apparent upon proceeding with the specification in connection with the accompanying drawing, in which Fig. 1 is a sectional assembly view showing a conventional type of valve such as that illustrated on page 298 of Crane Co.'s No. 52 Catalogue, and while a typical gate valve is illustrated, it is obvious that the invention is equally applicable to other types of valves, such as the rotary, globe and angle, or similar valves operating by means of an extended spindle or stem, whether the latter be of the threaded type or not.

Fig. 2 is a fragmentary plan elevation of one method showing the detailed application of a preferred embodiment of my invention so as to observe accurately its position.

Fig. 3 is a fragmentary sectional assembly view of the type of construction disclosed in Fig. 2 and which is also shown as applied to the general valve assembly view shown in Fig. 1.

Fig. 4 is a fragmentary plan elevation showing a modified form of construction for indicating the position of the stem.

Fig. 4 is a fragmentary sectional assembly view of the modified construction referred to in Fig. 4.

Similar reference characters refer to similar parts throughout the various views.

Referring now to Fig. 1, the gate valve illustrated therein comprises the essential parts designated by the letters as follows:—the body or casing A, the disc or valve closure B, the bonnet C, and mounted upon the bonnet is the yoke D. The valve is operated by the conventional means illustrated, to wit, a threaded stem 1, which in this case is of the rising type and is threadedly journalled within the yoke sleeve 2. Upon rotating the handwheel 3, which is in non-rotatable relation with the yoke sleeve as hereinafter explained, in a clockwise direction, looking down upon the valve, the valve will be closed and when the handwheel is rotated in a counter-clockwise direction the valve will open. The valve as illustrated is shown in the fully closed position, which latter valve position is significant insofar as a further description of the valve and application of my invention is concerned.

As previously described, the valve stem 1 being threadedly journalled within the yoke sleeve 2 upon which is non-rotatably mounted the handwheel 3, such non-rotatability being obtained by means of the tapered polygonal portion 4, allows for the handwheel to be fixedly held against removal by means of the threaded nut 5. The shank portion 6 of the yoke sleeve is preferably threaded, as indicated, which after assembly of the handwheel with the yoke permits the projection of the end surface 7 thereof, also as indicated. The valve yoke sleeve 2 being journalled within the bearing as at 8, of the preferably split type of yoke 9 allows for the free rotation of the yoke sleeve 2. By the rotation of the latter, the valve stem 1 is made to move upwardly or downwardly, depending upon the direction of rotation of the handwheel 3, such movement occurring upon the complementary threads 10 of the yoke sleeve 2.

After it has been observed that the valve is seated tightly as desired in an absolute metal to metal contact (as shown in Fig. 1) and tests indicate that the valve is satisfactory and tight for the service intended, either a cut made by a hack-saw blade or one made by a rotary milling cutter or wheel is provided, extending over and resting upon the transverse surface 7 (see Fig. 3). By the guidance afforded by the latter surface, a transverse cut is made into the side of the stem, as indicated at 11. Obviously, the lower horizontally extending surface 12 of the cut-in portion 11 will then match exactly in level with the surface 7 and preferably the transverse cut 11 into the stem 1 will then have its vertically extending surface 13 positioned at right-angles to or directly opposite to the direction of flow through the valve. Thus it is apparent that by the person simply observing whether the surfaces 12 and 7 match horizontally and whether the surface 13 is transversely positioned or substantially at right-angles to the direction of flow through the valve at such time as when such surfaces as 12 and 7 are positioned exactly in the same horizontal plane, the operator will then know that the valve closure member has reached its fully closed position and in effect will check with the position which has been determined by the manufacturer as being proper prior to its shipment from the factory. Of course, the person operating the valve, by touch, that is by merely passing the tip of the fingers over the surfaces 12 and 7 and by noting whether a step or offset exists between such surfaces, can thus determine readily and reasonably accurately the ultimate closed position of the valve, without actually seeing these surfaces.

Referring now to the modified construction shown in Fig. 5, there is likewise shown the stem 1 threadedly journalled within a similar yoke sleeve 2 actuated by the handwheel 3 in the same manner as that described for the construction illustrated in Fig. 3. However, in this construction it should be noted that rather than depending alone upon matching of the levels of the surfaces 12 and 7, the stem is longitudinally milled with a substantially vertical extending key-way as at 14, which is shown more clearly in Fig. 4. The advantages flowing from this construction lie in permitting the operator to look directly down upon the valve and thus observe whether the vertically machined key-way 14 of the stem corresponds with the similar horizontally machined groove or channel 15 of the yoke sleeve and then further observing that the surfaces 12 and 7 are in the same horizontal plane, as described for Figs. 2 and 3.

It should be apparent from the foregoing that the detailed constructions described merely refer to certain preferred constructions but that obviously numerous modifications may be made within the spirit of the invention, as for example, by simply making an arcuately cut out portion such as that provided by a high speed grinding wheel. I desire therefore to be limited only by the scope of the claim appended hereto.

I claim:

In a valve actuating mechanism of the character described, having relatively movable means for effecting the reciprocating movement of a closure member therewithin, the said movable means comprising respectively a non-rotatable reciprocably movable stem and a rotatable yoke sleeve, the said stem being journalled within the said yoke sleeve, each of the said latter means being provided with a valve position indicating means comprising complementary finished surfaces substantially vertically and horizontally arranged upon the said stem and the said yoke sleeve, whereby upon rotation of the said yoke sleeve to the extent of having the respective finished surfaces coincide, the closed position of the valve is accurately determinable.

CARL A. DOPP.